United States Patent
Zander

(10) Patent No.: US 12,209,881 B2
(45) Date of Patent: Jan. 28, 2025

(54) METHOD AND APPARATUS FOR ENABLING MAP UPDATES USING A BLOCKCHAIN PLATFORM

(71) Applicant: NVIDIA Corporation, Santa Clara, CA (US)

(72) Inventor: Justyna Zander, Cupertino, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 18/329,241

(22) Filed: Jun. 5, 2023

(65) Prior Publication Data

US 2023/0314168 A1    Oct. 5, 2023

Related U.S. Application Data

(63) Continuation of application No. 17/141,506, filed on Jan. 5, 2021, now Pat. No. 11,703,348, which is a
(Continued)

(51) Int. Cl.
*G01C 21/00*    (2006.01)
*G01C 21/36*    (2006.01)
(Continued)

(52) U.S. Cl.
CPC ......... *G01C 21/3841* (2020.08); *G01C 21/36* (2013.01); *G01C 21/387* (2020.08);
(Continued)

(58) Field of Classification Search
CPC ..... G06F 16/29; G01C 21/36; G01C 21/3848; G01C 21/3885; G01C 21/32;
(Continued)

(56) References Cited

U.S. PATENT DOCUMENTS 9,417,079 B2    8/2016  Xie
9,990,375 B2    6/2018  Mizoguchi
(Continued)

FOREIGN PATENT DOCUMENTS

CN    107045650 A    8/2017
CN    108292397 A    7/2018
(Continued)

OTHER PUBLICATIONS

Zander, Justyna; First Office Action for Chinese Patent Application No. 201910490181.3, filed Jun. 6, 2019, mailed Dec. 6, 2023, 9 pgs.
(Continued)

*Primary Examiner* — Tuan C To
(74) *Attorney, Agent, or Firm* — Taylor English Duma L.L.P.

(57) ABSTRACT

A semi-public blockchain maintained on one or more nodes in a map cloud platform comprises data for maintaining a global map of a predetermined geographic area. The blockchain also comprises a plurality of data records, where each data record is associated with an update to a global map. When a message associated with a map update to the global map is received, the nodes of the blockchain determine a consensus by evaluating the map update, where the evaluating comprises performing a plurality of proofs including a proof of location, a proof of iterations, a proof of physical delivery and a proof of safety. When consensus is attained and the map update is validated, a data record associated with the map update is generated and added to the blockchain with a timestamp and a link to prior data records in the blockchain.

20 Claims, 11 Drawing Sheets

Related U.S. Application Data continuation of application No. 16/053,649, filed on Aug. 2, 2018, now Pat. No. 10,915,115.

(51) Int. Cl.

| | | |
|---|---|---|
| *G05D 1/00* | (2006.01) | |
| *G05D 1/02* | (2020.01) | |
| *G06F 16/27* | (2019.01) | |
| *G06F 16/29* | (2019.01) | |

(52) U.S. Cl.
CPC .......... *G05D 1/0276* (2013.01); *G06F 16/27* (2019.01); *G06F 16/29* (2019.01)

(58) Field of Classification Search
CPC ............. G01C 21/3635; G05D 1/0276; G05D 1/0088; B60W 60/0015; G06K 9/00791
USPC .......................................................... 701/451
See application file for complete search history.

(56) References Cited

U.S. PATENT DOCUMENTS

| | | | |
|---|---|---|---|
| 10,915,115 B2 | 2/2021 | Zander | |
| 10,938,548 B2 | 3/2021 | Mercuri et al. | |
| 10,942,525 B2* | 3/2021 | Nagy | G08G 1/207 |
| 10,989,559 B2 | 4/2021 | Zhao | |
| 10,999,719 B1* | 5/2021 | Kaplan | G06F 16/29 |
| 11,703,348 B2 | 7/2023 | Zander | |
| 2008/0208451 A1 | 8/2008 | Minami | |
| 2011/0179080 A1 | 7/2011 | Miyazaki et al. | |
| 2011/0191285 A1 | 8/2011 | Sawai | |
| 2012/0029817 A1 | 2/2012 | Khorashabdi et al. | |
| 2013/0076766 A1 | 3/2013 | Yamagishi | |
| 2013/0245932 A1* | 9/2013 | Beaurepaire | G01C 21/3461 |
| | | | 701/538 |
| 2013/0275371 A1 | 10/2013 | Chang | |
| 2015/0100231 A1* | 4/2015 | Weir | G01C 21/3641 |
| | | | 701/400 |
| 2016/0259814 A1 | 9/2016 | Mizoguchi | |
| 2017/0132625 A1 | 5/2017 | Kennedy | |
| 2017/0344987 A1 | 11/2017 | Davis | |
| 2018/0004223 A1 | 1/2018 | Baldwin | |
| 2018/0020324 A1 | 1/2018 | Beauford | |
| 2018/0025181 A1 | 1/2018 | Barinov et al. | |
| 2018/0211115 A1 | 4/2018 | Klein | |
| 2018/0188045 A1* | 7/2018 | Wheeler | G06V 10/98 |
| 2018/0189753 A1 | 7/2018 | Konda et al. | |
| 2018/0315055 A1 | 11/2018 | Pickover et al. | |
| 2018/0342036 A1 | 11/2018 | Zachary | |
| 2018/0356236 A1 | 12/2018 | Lawrenson et al. | |
| 2018/0359089 A1 | 12/2018 | Innes et al. | |
| 2019/0007484 A1 | 1/2019 | Chen et al. | |
| 2019/0007788 A1 | 1/2019 | Russell | |
| 2019/0096253 A1 | 3/2019 | Stenneth | |
| 2019/0163896 A1 | 5/2019 | Balaraman et al. | |
| 2019/0178657 A1 | 6/2019 | Benbrahim et al. | |
| 2019/0187723 A1* | 6/2019 | Tao | G08G 1/0133 |
| 2019/0279247 A1 | 9/2019 | Finken et al. | |
| 2019/0319928 A1 | 10/2019 | Nesbit | |
| 2019/0327259 A1 | 10/2019 | DeFelice | |
| 2019/0391268 A1 | 12/2019 | Houts et al. | |
| 2020/0027183 A1 | 1/2020 | Guttridge | |
| 2020/0351537 A1 | 11/2020 | Browy et al. | |

FOREIGN PATENT DOCUMENTS

| | | | | |
|---|---|---|---|---|
| EP | 2650648 A2 | 10/2013 | | |
| JP | 20106161456 A | 9/2016 | | |
| JP | 2018077843 A | 5/2018 | | |
| WO | WO-2008019879 A2 * | 2/2008 | ............. | G01C 21/26 |
| WO | WO-2008019881 A1 * | 2/2008 | ............. | G01C 21/26 |
| WO | 2016126321 A1 | 8/2016 | | |
| WO | 2017180382 A1 | 10/2017 | | |

OTHER PUBLICATIONS

Zander, Justyna; Non-Final Office Action for U.S. Appl. No. 17/141,506, filed Jan. 5, 2021, mailed Oct. 6, 2022, 15 pgs.

Zander, Justyna; Notice of Allowance for U.S. Appl. No. 17/141,506, filed Jan. 5, 2021, mailed Mar. 7, 2023, 6 pgs.

"Frequently Asked Questions", Retrieved from the Internet URL: https://www.mapplatform.com/faq.html, accessed on Jun. 15, 2018, 8 pgs.

"Cars That Truly Drive Themselves: Blockchain-Enabled AV's", Retrieved from the Internet URL: https://techburst.io/cars-that-truly-drive-themselves-blockchain-enabled-avs-7b7f7e8a358b, accessed on Jun. 15, 2018, 8 pgs.

"It is Time to Reclaim Our Maps- and Improve Them", Mapping Aggregation Platform—Medium, Retrieved from the Internet URL: https://medium.com/mappingaggregationplatform/it-is-time-to-reclaim-our-maps-and-improve-them-c22ca9830e35, accessed on Jun. 15, 2018, 9 pgs.

Bruzzone, et al.; "Toward the Automatic Updating of Land-Cover Maps by a Domain-Adaptation SVM Classifier and a Circular Validation Strategy," IEEE Transactions on Geoscience and Remote Sensing, vol. 47, No. 4, Apr. 2009, 15 pgs.

Jomrich, et al.; "Dynamic Map Update Protocol for Highly Automated Driving Vehicles," in Proceedings of the 3rd International: 3rd International Conference on Vehicle Technology and Intelligent Transport Systems (VEHITS), 2017, 11 pgs.

Sood; "Why Location Data is the Driving Force Behind Autonomous Cars", Nov. 7, 2017, 10 pgs.

Ye, et al.; "A Novel Adaptive Radio-Map for RSS-Based Indoor Positioning", International Conference on Green Informatics, 2017, 6 pgs.

\* cited by examiner

EXEMPLARY
COMPUTER SYSTEM
1000

METHOD AND APPARATUS FOR ENABLING MAP UPDATES USING A BLOCKCHAIN PLATFORM

RELATED APPLICATIONS

This application is a continuation of U.S. patent application Ser. No. 17/141,506, filed Jan. 5, 2021, which is a continuation of U.S. patent application Ser. No. 16/053,649, filed Aug. 2, 2018. Each of which is incorporated herein by reference in its entirety.

FIELD OF THE INVENTION

This present invention refers generally to techniques for performing electronic map updates in autonomous vehicles. More specifically, the present invention is directed to a solution for providing and validating map updates globally for autonomous vehicles using blockchain technology.

BACKGROUND

Autonomous vehicles may rely heavily on pre-stored map data for map-assisted navigation. As autonomous vehicles increase in prevalence, it is exceedingly important to provide the vehicles with reliable and current map updates in real-time to allow them to react to changing conditions caused by, for example, road closures, traffic conditions, etc. in a time-sensitive fashion. In particular, areas such as construction zones often change quickly—causing prior map data of the areas to be inaccurate or obsolete. Consequently, the autonomous vehicle needs to not only be able to detect the construction zones, but also needs to be able to decide how the vehicle should maneuver through these zones. Providing the most up-to-date available map information to autonomous vehicles in real-time is, therefore, vital for the operation of the vehicles.

Currently, all known vendors providing map data for autonomous vehicles use their own proprietary format when communicating both maps or map updates to autonomous vehicles. No consistent mapping platform or map update format has emerged as a standard within the vendor group. As a result, no standardized and scalable working solution for map update support exists in the industry today, and any solutions presented by the respective vendors differ and remain isolated from each other. Furthermore, the isolated solutions that emerge may be controlled by at least one organization and/or entity in a select geo-region. This type of control is blocking the autonomous driving industry from acquiring proper maps and map updates instantly in every geo-region.

In a typical scenario, map update information is sent to a vendor proprietary server that is not open to receiving map updates from outside the vendor's ecosystem. Accordingly, there is no common platform or format available that solves the map update problem globally and democratizes map updates or the validation of the map updates. Furthermore, there is no way to check the accuracy of map updates provided by a given vendor, which makes industry-wide adoption of any particular solution unfeasible. This is problematic as autonomous vehicles become more prevalent because, without a consistent format or platform for exchanging and validating map updates, vehicles will be prevented from seamlessly exchanging vital location and route-related information between each other.

SUMMARY OF THE INVENTION

This Summary is provided to introduce a selection of concepts in a simplified form that are further described below in the Detailed Description. This Summary is not intended to identify key features or essential features of the invention, nor is it intended to be used to limit the scope of the invention.

Aspects of the present invention are directed to techniques for using a blockchain mechanism to provide a uniform platform and format for processing, exchanging and validating map updates associated with an electronic map that may be used by autonomous vehicles. The blockchain provides a secure, transparent and decentralized distributed database and platform capable of being updated by various different vendors (e.g., Original Equipment Manufacturers or automotive manufacturers (OEMs), mapping companies, map update companies, companies that deliver ground truth data, semiconductor companies, software provider companies, companies that rely on data from GPS devices, and suppliers that supply parts, e.g., sensors, or systems to the OEMs (e.g., Tier 1, Tier 2 and Tier 3 suppliers), etc.) that utilize the uniform map platform and update format associated with the blockchain. According to one aspect of the present invention, one or more map servers can be configured as nodes on the blockchain—the nodes accept map update communications from various different vendors and sources (including sensors and cameras on autonomous and non-autonomous vehicles) to update and maintain a server-based electronic map.

According to one aspect of the invention, the map data in the blockchain is held in an interlinked network of computers, which is not necessarily owned or run by any central authority. While several members of a mapping ecosystem may be able to make updates to the map data, in one embodiment, a single vendor may be responsible for operating the cloud platform on which the blockchain is implemented. Each contributor to the ecosystem attempting to make an update to the blockchain will typically need to be able to communicate using the consistent format and protocol of the blockchain. Alternatively, in one embodiment, the operator of the cloud platform may provide the various contributors to the ecosystem with an application programming interface (API) that, among other things, converts data that is in a vendor-specific format to a unified format compatible with the blockchain.

According to yet another aspect of the invention, the blockchain platform for map updates would be a semi-public ledger accessible only by users that are authorized, e.g., autonomous vehicles, survey cars, etc. or vendors that are part of the ecosystem and have active subscriptions to the mapping platform.

According to one or more embodiments, map updates are treated as a type of crypto-asset and the blockchain platform is used to trade map updates between the car units. For example, a crypto-asset referred to as a Map Update Token (MUT) may be used for trading map update information between autonomous car units. The MUTs may be used, inter alia, to reward vendors and end-consumers (or drivers) for providing valid map updates to the blockchain. The MUTs may also be used to track the reputation score associated with drivers and vendors. Further, the MUTs may be used to control access to the mapping data on the blockchain.

According to an aspect of the present invention, a solution is proposed for attaining consensus for map updates between the various interlinked nodes on the blockchain. Embodiments of the present invention attain consensus for the map updates provided to the blockchain by dynamically selecting and performing at least one of a tuple of multiple proofs, namely: a) Proof of Location (where the location of a map update is verified via other vehicles); b) Proof of Iterations (where a particular update is validated as true only after a number of similar updates are received); c) Proof of Safety that may include at least one proof, such as (without limitation): Proof of Functional Safety, Proof of Safety of the Intended Function, Proof of System Safety, and alike (any combination of risk avoidance, risk mitigation, prevention, validation, authorization techniques may be used) and d) Proof of Physical Delivery (the data authenticates its origin and accuracy). In one embodiment, the selecting of one or more proofs may be dynamic and may be dependent at least, in part, on a number of factors, for example, available sensor configurations, external conditions and the complexity of the environment.

More specifically, in one embodiment, a server-based method for updating map data using a blockchain is presented. The blockchain comprises data for maintaining the global map of a predetermined geographic area. The method comprises storing the blockchain at a server, where the blockchain is a semi-public distributed database including a plurality of data records, each data record being associated with an update to the global map. The method further comprises receiving a message associated with a map update to the global map, where the message comprises information pertaining to a map update for a particular route. Consensus regarding the map update is determined by evaluating the map update. The evaluating comprises dynamically selecting and performing at least one of a plurality of "proofs." The plurality of proofs may include one or more of a proof of location, a proof of iterations, a proof of physical delivery and a proof of safety. In response to validating the map update against the plurality of proofs, the method comprises generating a data record associated with the map update. Subsequently, the blockchain is updated to include the generated data record and, thereafter, the generated data record is electronically transmitted to a plurality of nodes in the blockchain.

In some embodiments, the message is formatted based on a data format standard compatible with the blockchain. In other embodiments, the message is formatted based on a proprietary data format standard of a vendor, where the message is converted from the propriety data format of the vendor to the data format standard compatible with the blockchain prior to generating consensus regarding the map update.

In some embodiments, performing the proof of location comprises validating a map update received by a first mobile unit after a location of the first mobile unit is verified by a map update of a second mobile unit.

In some embodiments, performing the proof of iterations comprises validating a map update received by a first mobile unit after the map update of the first mobile unit is verified by an analogous map update of a second mobile unit, and after a route associated with the map update of the first mobile unit has been verified a threshold number of times by one or more mobile units.

In some embodiments, performing a proof of physical delivery comprises automating a shipment of data associated with the global map and corresponding map updates to a data center wherein the server is maintained and adding a tracking number associated with the shipment to the blockchain.

In some embodiments, performing a proof of safety comprises performing multiple iterations for the proof of location and the proof of iterations.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Figure 1:
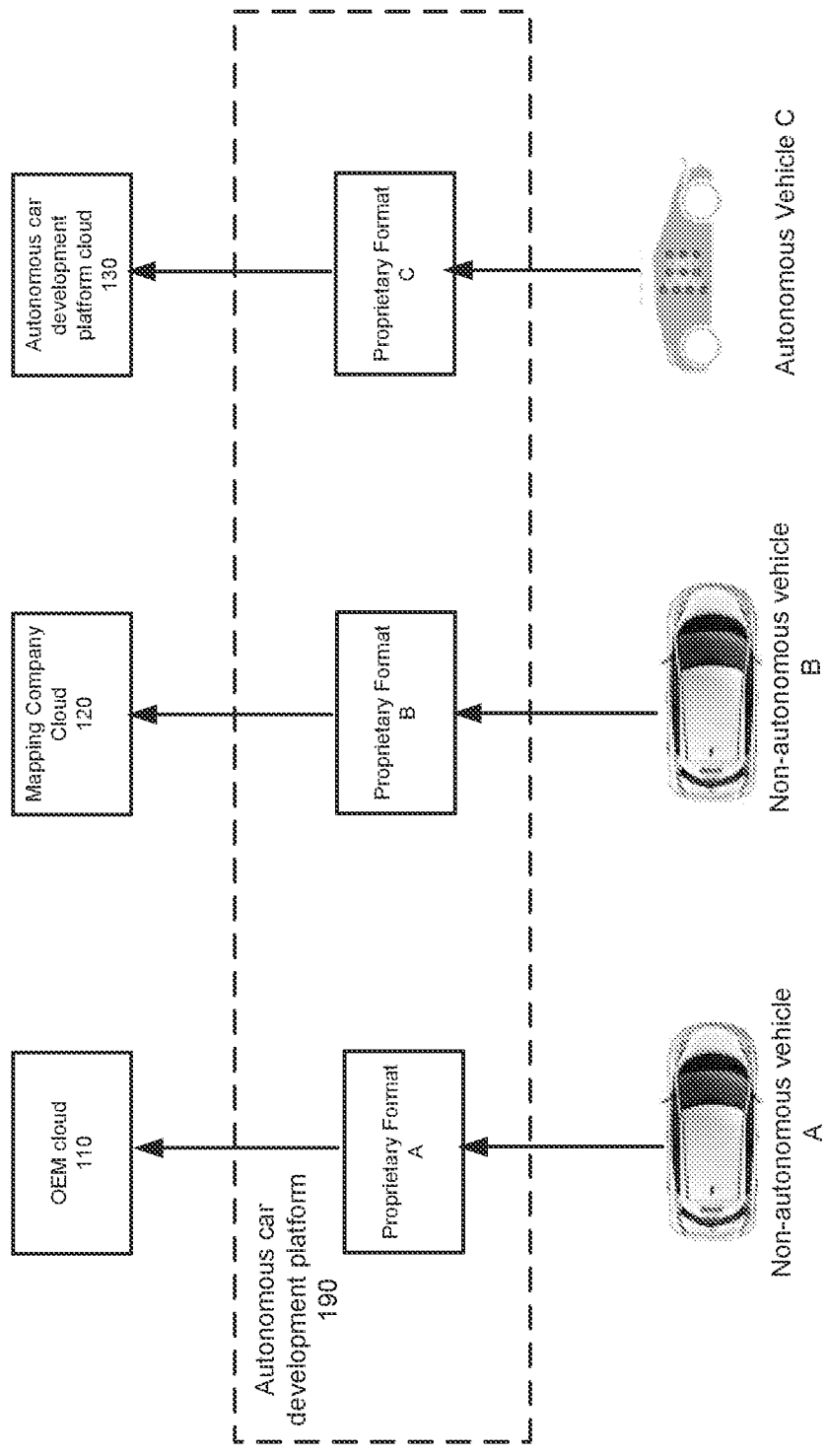
FIG. 1 is a diagram that illustrates the challenges associated with the conventional techniques in which map updates are handled.

Reference will now be made in detail to the preferred embodiments of the invention, a method and system for using a blockchain mechanism to provide a uniform platform and format for processing, exchanging and validating map updates associated with an electronic map that can be used by autonomous vehicles, examples of which are illustrated in the accompanying drawings. While the invention will be described in conjunction with the preferred embodiments, it will be understood that they are not intended to be limit to these embodiments. On the contrary, the invention is intended to cover alternatives, modifications and equivalents, which may be included within the spirit and scope as defined by the appended claims.

Furthermore, in the following detailed descriptions of embodiments of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "receiving," "authenticating," "converting," "evaluating," "updating,", "refining," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Embodiments of the invention are directed to novel solutions for providing a uniform platform and format for processing and validating map updates associated with an electronic map for autonomous vehicles using a blockchain mechanism.

Conventional Mapping Systems and Challenges Associated Therewith

Vendors for conventional mapping systems used in autonomous vehicles typically utilize their proprietary format when communicating both map information or map updates to autonomous vehicles. Accordingly, there does not presently exist a standardized mapping platform, format, or map update format in the mapping industry. Because no standardized, scalable solution for supporting map updates currently exists that also supports multiple geo-regions and complies to national policies, any solutions presented by the various vendors differ and remain isolated from one another. Further, because vendors are not able to exchange information freely, they are forced to rely on fragmented coverage and/or expensive means such as using survey cars to update their map information.

Vendors that may provide mapping solutions for autonomous vehicles may include mapping companies, map update companies, automotive manufacturers (OEMs), companies that deliver ground truth data, semiconductor companies, software provider companies, companies that rely on data from GPS devices, and suppliers that supply parts, e.g., sensors, or systems to the OEMs (e.g., Tier 1, Tier 2 and Tier 3 suppliers). It should be noted that producers of the autonomous car development platforms, e.g., NVIDIA DRIVE™, for instance, may also provide their own mapping solutions that are technically and regionally scalable. The autonomous car development platform can be a scalable artificial intelligence (AI) driven platform—built around deep learning—that, among other things, provides mapping technology for autonomous vehicles and enables automakers and mapping companies to rapidly create high-definition (HD) maps, light HD maps, light maps, standard navigation maps, and alike, and also to maintain them. Typically, the platform is capable of fusing data from at least one or multiple cameras, as well as lidar, radar and ultrasonic sensors configured in the autonomous vehicle to understand the full 360-degree environment around the car to produce a robust representation, including static and dynamic objects. Further, an autonomous vehicle configured with the platform is also capable of precisely localizing itself to an HD map (also known as 'localization') and plan a safe path forward. Deep neural networks are used for the detection and classification of objects to increase the accuracy of the fused sensor data.

FIG. 1 is a diagram that illustrates the challenges associated with the conventional techniques in which map updates are handled. Drivers of non-autonomous vehicles typically receive their mapping data from the GPS systems preconfigured into their vehicles (provided by the OEM) or through independent mapping companies (e.g., mapping companies that provide data to GPS device manufacturers). For example, conventional Car A in FIG. 1 receives mapping information from an OEM cloud 110 (maintained by the manufacturer of Car A), wherein the data is formatted using proprietary format A used by the respective OEM. Similarly, conventional Car B receives mapping data from the mapping company cloud 120 (maintained by a company that provides mapping data and services), wherein the data is formatted using proprietary format B used by the respective mapping company.

A developer of an autonomous car development platform 190 for autonomous vehicle C may also have their own proprietary format C that is used to store and exchange mapping data stored in cloud server 130. Developers of the autonomous car development platform 190 may, nevertheless, be able to collaborate and create partnerships with OEMs, mapping companies to increase the accuracy of the mapping data—resulting in more precise localization and a more robust representation of the environment. As shown in FIG. 1, autonomous car development platform 190 may be capable of integrating mapping data from other proprietary formats, e.g., proprietary format A and B. While partnerships with other vendors to receive and integrate accurate mapping data is beneficial, there are significant challenges associated with it. Most importantly, there is no common platform or format available that solves the map update problem globally and democratizes map updates, authorization, and/or the validation of the map updates. Without a consistent format or platform for exchanging map updates, and for validating map updates in real-time, autonomous vehicles are prevented from seamlessly exchanging vital location and route-related information in real-time between each other.

Other less obvious challenges associated with creating a common mapping ecosystem between the vendors include the difficulty of reliably verifying the map updates reported by any particular vendor. The map updates provided by a given vendor need to be trustworthy. To ensure trustworthiness, the source of the mapping data including the updates needs to be traceable. Further, what is required is a mechanism for auditing the map data and holding vendors accountable for the credibility of the updates provided by their respective platforms.

Also, the ecosystem needs to be able to provide varying levels of access to the mapping data. For example, a driver of an autonomous vehicle with an integrated autonomous car development platform may only need visible access to the map updates, but may not care about the content of the contribution. A mapping partner, e.g., a mapping company, however, may need to access the content of the map updates provided to authenticate the content or to make decisions based on the content.

The mapping data in the ecosystem and their sources need to be transparent, while at the same time protecting the privacy of the vendors and the users of the ecosystem. Other requirements of the navigation ecosystem may include transparent pricing for access to the ecosystem, accurate billing, and a mechanism for rewarding drivers and vendors for providing accurate map updates.

Finally, as mentioned previously, most vendors will rely on expensive means such as survey cars to update their map information. While survey cars are equipped with several sensors and are capable of generating accurate mapping data, they are expensive and inefficient. Survey cars, for example, capture changes in routes in real-time, but they only drive a limited amount of time and on a limited number of roads. If a particular route changes as a result of construction work, a survey car may not be able to update the map information until it makes at least one or more passes through the route. At present, because of the inability to freely exchange map-related information, no vendor has been able to find a reliable way of crowd sourcing information to generate map updates at scale and across all regions. In other words, currently there is no reliable and efficient mechanism in place for both non-autonomous vehicles and autonomous vehicles to be able to contribute map updates to a mapping ecosystem across the globe in a manner that would benefit every stakeholder and also result in valid, safe, and authorized map updates.

Blockchain Mechanism for Exchanging and Validating Map Updates in Real Time

Embodiments of the present invention provide a uniform platform and format for processing and validating map updates for updating an electronic map that can be used by autonomous vehicles, among other uses. Furthermore, embodiments of the present invention solve the map update problem using an update format and map servers that utilize blockchain technology—specifically, a blockchain able to accept map update communications from various different vendors to update and maintain a server-based electronic map. In one embodiment, map updates are treated as a type of crypto-asset and a crypto-engine associated with a blockchain is used to trade map updates between the car units.

Figure 2A:
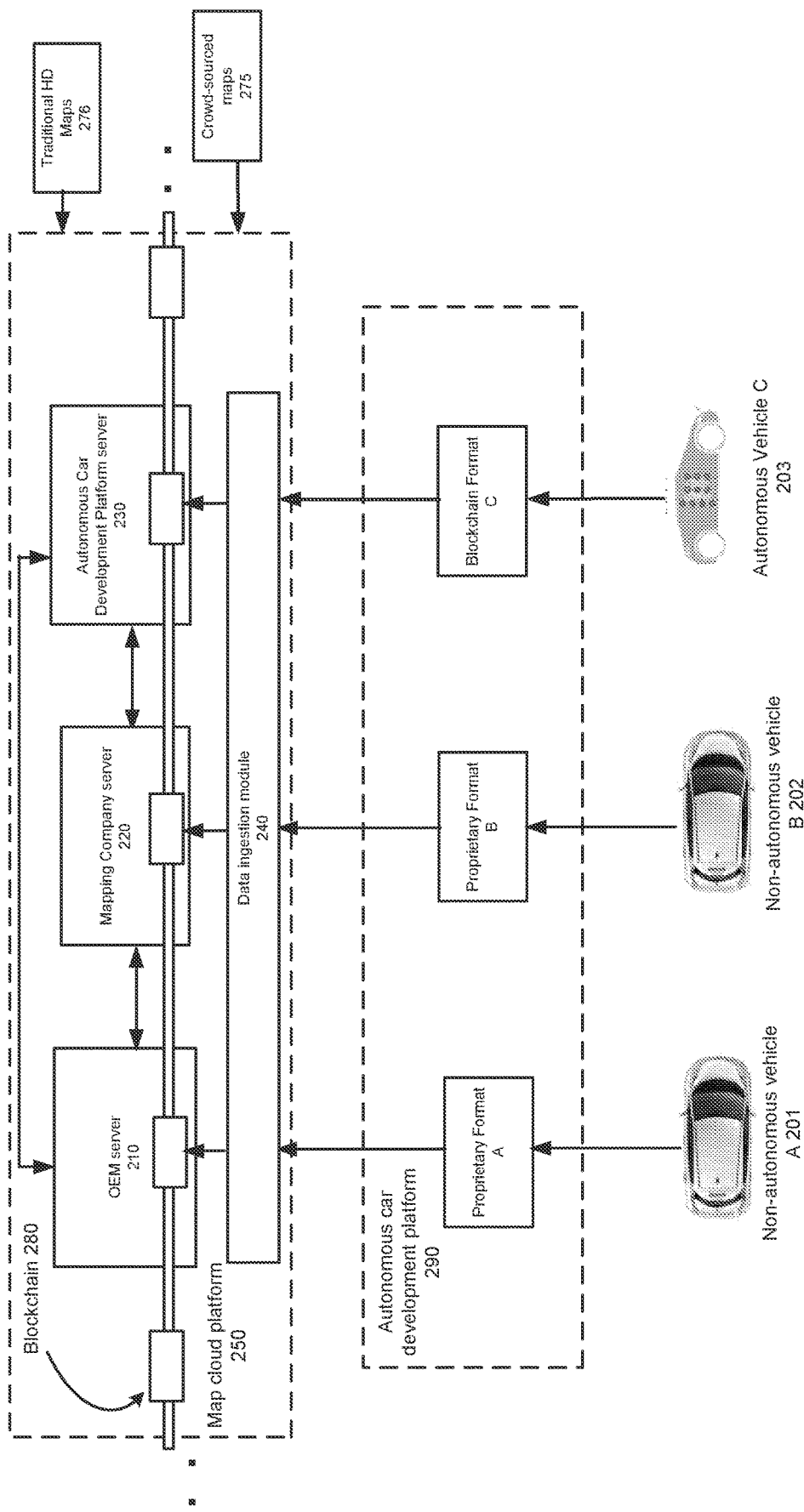
FIG. 2A is a diagram that illustrates the manner in which blockchain technology can be used to provide a standardized mechanism for providing map updates in a mapping ecosystem in accordance with an embodiment of the present invention.

FIG. 2A is a diagram that illustrates the manner in which blockchain technology can be used to provide a standardized mechanism for providing map updates in a mapping ecosystem in accordance with an embodiment of the present invention. As shown in FIG. 2A, map updates from various cars (e.g., car A 201, car B 202, autonomous vehicle C 203, etc.) can be stored and validated using a blockchain 280, which may be implemented across an interlinked network of cloud computing resources and/or servers (comprising, for example, OEM server 210, mapping company server 220, autonomous car development platform server 230, etc.). Alternatively, in a different embodiment (as will be illustrated in FIG. 2B), the blockchain may be implemented on nodes that are separate from the vendor-managed servers. Note that the interlinked network of servers maintained on the mapping platform 250 may also comprise servers from mapping companies, companies delivering ground truth data, software provider companies, semiconductor companies, Tier 1 companies, companies who rely on GPS data for their products and services, and other vendors who are part of the autonomous vehicle or mapping data supply chain.

In one embodiment, data from OEMs, mapping companies, companies delivering ground truth, semiconductor companies, software provider companies, Tier 1 suppliers, companies who utilize GPS data, etc. may be part of the map cloud platform 250 on a single and/or distributed server. In another embodiment, a server or data from at least one of the representative vendor companies may be part of the mapping cloud platform 250 on a single and/or distributed server.

In yet another embodiment, at least one of the representative companies from a pool of OEMs, mapping companies, companies delivering ground truth data, semiconductor companies, software provider companies, Tier 1 suppliers, companies who utilize GPS data, government organizations, dedicated software providers, etc. may be part of the map cloud platform 250 on a single and/or distributed server. This embodiment would be particularly useful in geographic areas where government bodies would be part of the mapping ecosystem supply chain.

The blockchain 280 uses a secure, transparent and decentralized distributed database capable of being updated by various different map vendors and/or other entities, where the map updates are added to the blockchain 280 using a consistent format and/or after being converted to a consistent format. It should be noted that because blockchains are not designed to act as a storage medium, transactions, e.g., map updates provided to the blockchain tend to be relatively small, and large amounts of data pertaining to the blockchain are stored "off chain" with pointers and references stored within the chain and/or in cache memory, and alike.

In one embodiment, each entity attempting to make a map update to the blockchain communicates using the format and protocol used by the blockchain, thereby, ensuring consistency between the various vendors. Alternatively, in a different embodiment, such as the one illustrated in FIG. 2A, map update data communicated from at least one of the vendors may need to be converted to a consistent format before being added to the blockchain 280. As shown in FIG. 2A, map updates made by autonomous vehicle C 203 use the blockchain format C and, accordingly, for data being transmitted from autonomous vehicle C, data ingestion module 240 may simply provide data and time synchronization. In other words, the format of the data from autonomous vehicle C does not need to be converted prior to updating blockchain 280, but the data may need to be synchronized by the data ingestion module 240. By contrast, updates from non-autonomous vehicle A 201 using proprietary format A and non-autonomous vehicle B 202 using proprietary format B are converted using data ingestion module 240 in the map cloud platform 250 before being added to the blockchain. It should be noted that for non-autonomous vehicles (e.g., car A 201 and car B 202) to be able to contribute map updates, they may need to be equipped with cameras and other types of sensors (e.g., lidar, radar and ultrasonic sensors) that are calibrated to capture localization and route-related information.

In one embodiment, servers 210, 220 and 230 are computer system nodes on blockchain 280 that work together to manage map related data and transactions, e.g., map updates pertaining to the map data. It should be noted that while the discussion herein is limited to three exemplary nodes, a typical blockchain will comprise several nodes. Any transaction, e.g., a map update communicated to one of the nodes—from an autonomous or non-autonomous vehicle—may be broadcast to some or all of the other nodes. The nodes receiving the transaction need to confirm and verify the transaction to ensure that the transaction is authentic. When the recipient nodes have reached a consensus that the transaction is legitimate and can be accepted, a new block on the blockchain 280 can be created. The block may typically include other confirmed transactions as well. Subsequently, the block of confirmed transactions, e.g., confirmed map updates is recorded on the blockchain 280. In other words, the block is time-stamped, linked to the immediately preceding block and added to the blockchain.

In one embodiment, the blockchain platform 280 for map updates would be a semi-public ledger and accessible only by users that are authorized, e.g., drivers of authorized autonomous vehicles or vendors that are subscribing members of the ecosystem, e.g., OEMs, Tier 1 suppliers, etc. Further, in an embodiment, private keys for accessing and making contributions to the blockchain platform may be assigned only to vendors or subscribers to the mapping platform that contribute accurate and reliable map updates. In such an embodiment, all subscribing members may have visibility of any data contribution made to the platform, but access control mechanisms such as (without limitation) encrypted keys and smart contracts may be used to limit access to the contents of the contributions to only the members holding the private keys. Further, the ability to make updates may be limited only to members holding private keys.

In one or more embodiments, the blockchain 280 may not necessarily be owned or run by any central authority, in one embodiment, one of the vendors, e.g., the developers of the autonomous car development platform 290 (or any other vendor or party that is part of the mapping ecosystem) may establish and manage a map cloud platform 250 on which the blockchain may be maintained. In such an embodiment, the vendor managing the cloud platform 250 may provide an application programming interface (API) to the other vendors in the ecosystem, where the API, among other things, may be programmed to enable the vendor-operated servers to interface with the blockchain 280. For example, an API may be provided to the vendors associated with servers 210 and 220 to allow them to convert the data from their proprietary format into the unified format of the blockchain 280.

In one embodiment, the electronic maps maintained by the blockchain can either be traditional HD maps 276 (provided by, for example, digital mapping companies) or crowd-sourced maps 275 (provided by, for example, geospatial start-up companies). These electronic maps are normalized to the unified format before they are incorporated into the blockchain. The blockchain will store the foundational HD maps (e.g., ground truth maps) and also any updates to these HD maps (that may, for example, be received through data ingestion module 240).

Figure 2B:
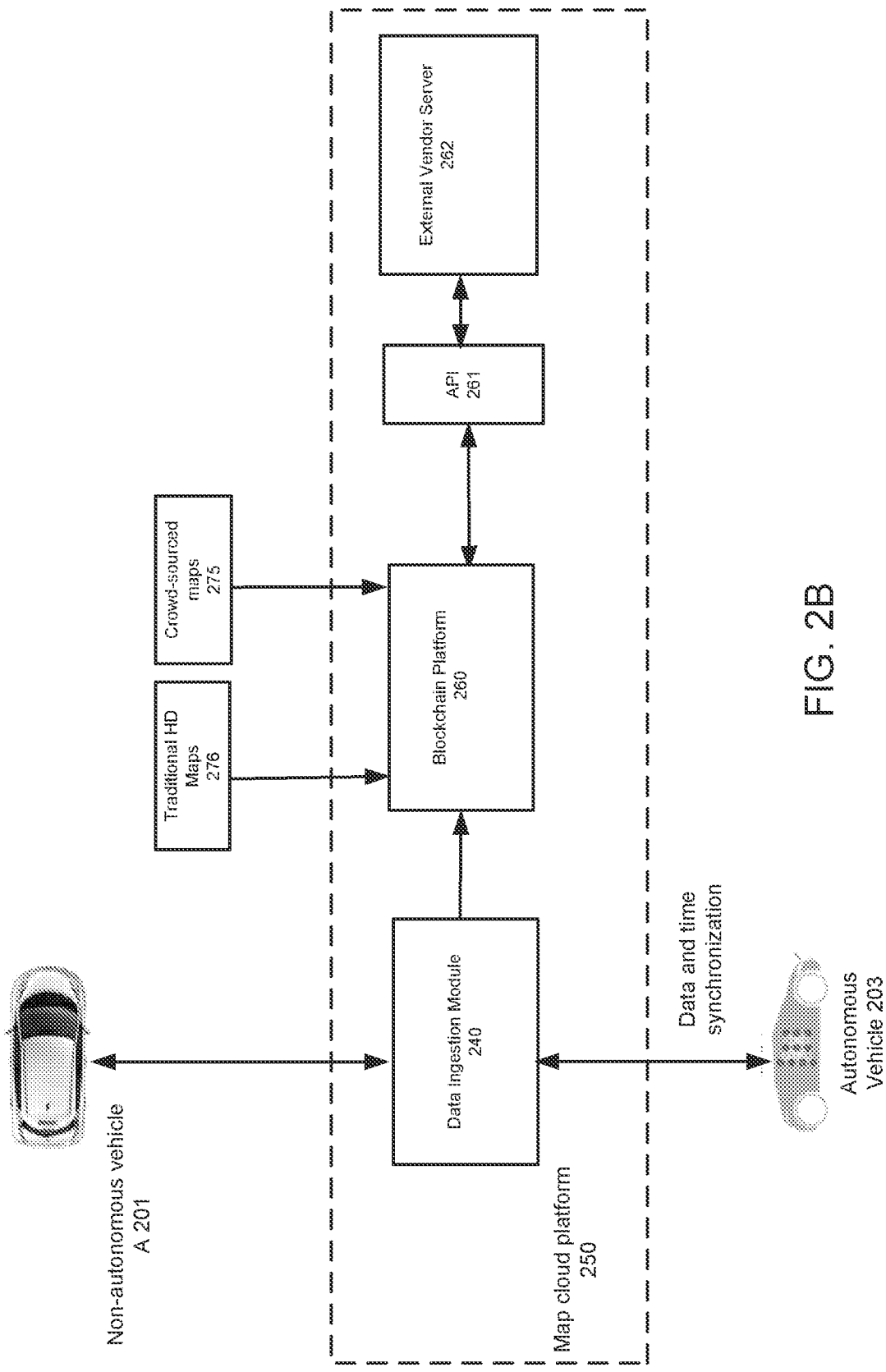
FIG. 2B is a diagram that illustrates an alternative embodiment for storing electronic maps and updates in a mapping ecosystem in accordance with an embodiment of the present invention.

FIG. 2B is a diagram that illustrates an alternative embodiment for storing electronic maps and updates in a mapping ecosystem in accordance with an embodiment of the present invention. As noted above, in some embodiments, the blockchain may be implemented on separate nodes from the vendor servers on the map cloud platform 250. As shown in FIG. 2B, the blockchain platform 260—comprising the nodes of the blockchain—are implemented on the map cloud platform 250 separately from the vendor servers, e.g., external vendor server 262. In this embodiment, the blockchain platform 260 stores, fuses, and processes the data from the various vendors on an ecosystem blockchain. The blockchain platform also stores the foundational maps (e.g., ground truth data, HD maps, light HD maps, SD maps, 3D map content, weather conditions, day and night conditions, points of interest, and alike) and updates to these maps. The foundational maps may either be traditional HD maps 276 or crowd-sourced maps 275, as mentioned previously.

The data ingestion module 240 is capable of receiving data and generating updates to the maps. As discussed in connection with FIG. 2A, the data ingestion module will, among other things, convert the data from a vendor proprietary format to the unified format of the blockchain. For example, in the case of non-autonomous vehicle 201, the data ingestion module may be operable to receive the data in a vendor-specific format and convert the data into the blockchain format. In the case of autonomous vehicle 203, however, the data may already be in the blockchain format. In this case, the data ingestion module 240 may provide data and time synchronization services prior to adding the data to the blockchain.

Each of the vendor servers, including server 262, uses the API 261 provided by the manager of the map cloud platform 250 in order to communicate with the blockchain and convert their map updates to the unified format required by the blockchain. Further, the API also enables the vendors to receive map updates from the blockchain seamlessly using a format and protocol that can be processed the respective vendors.

Typically, blockchains are associated with crypto-assets, which are digital assets designed to work as a medium of exchange that use cryptography to secure and verify transactions made on the blockchain and control the creation of additional units. As mentioned above, embodiments of the present invention use map updates as a type of crypto-asset, and a crypto-engine associated with the blockchain is used to trade map updates between the car units. In one embodiment, the assets of the blockchain of the present invention would also include map related data and map tiles. For example, a crypto-asset referred to as a Map Update Token (MUT) may be used as an exchange medium for trading assets, e.g., trading map update information between autonomous car units. The MUTs are stored and exchanged in one unified format using map cloud platform 310. The MUTs may be used, inter alia, to reward vendors and end-consumers (or drivers) for providing valid map updates to the blockchain. In other words, MUTs are used to assign value to drivers and vendors for providing reliable and accurate map updates to the mapping ecosystem. In one embodiment, the MUTs may be shared between the involved parties with weighted contributions.

According to one or more embodiments, the MUTs may be tied to a monetary incentive that a driver or vendor receives for providing a certain number of accurate map updates. Alternatively, the MUTs may be exchanged for credits that entitle a driver or vendor to receive a certain number of map updates from the mapping system free of charge.

According to another embodiment, MUTs can also be used to track the reputation and credibility of a particular driver, driving unit, and/or vendor. A driver may build a reputation score by contributing updates that are not contradicted by or inconsistent with more accurate data from other sources. For example, a driver with a high reputation score may be driving a survey car with more accurate and advanced sensors. Accordingly, map updates from the driver may rarely be superseded by more precise information from other vehicles. Drivers with high reputation scores may, as noted above, be rewarded with MUTs and assigned a private key for contributing their updates to the cloud platform 250.

The MUTs can, in one or more embodiments, also be used to control access to the mapping data on the blockchain. For example, using (as an example and without limitation) encrypted keys and smart contracts, the map cloud platform 250 may make map updates available only to members of the ecosystem that have a requisite number of MUTs to acquire the updates. The MUTs, in other words, can be used as currency to purchase, exchange, and/or sell map updates. In one embodiment, the MUTs may only be made available to members that contribute their own map updates to the cloud platform 250. In order to receive map updates, members may, for instance, be required to also be contributing members of the ecosystem.

According to one or more embodiments, there may be several scenarios in which MUTs can be used for trading map updates. An autonomous or non-autonomous vehicle may earn an MUT for contributing accurate data regarding a particular route or accurate location information pertaining to another vehicle on the road. Similarly, a vehicle may earn an MUT any time it passes through an established route and confirms it. In other words, MUTs may be earned for iterating over known routes. A vendor-operated vehicle, e.g., a survey car may earn tokens by creating new routes and iterating over the routes multiple times. Similarly, vendor-operated vehicles may also earn tokens for creating regular map updates. An autonomous vehicle, e.g., one running autonomous car development platform 230 may earn tokens by using deep learning or other AI procedures to improve map updates. MUTs may be consumed by all types of vehicles by either consuming map-related data from the blockchain or by consuming map updates.

Figure 3:
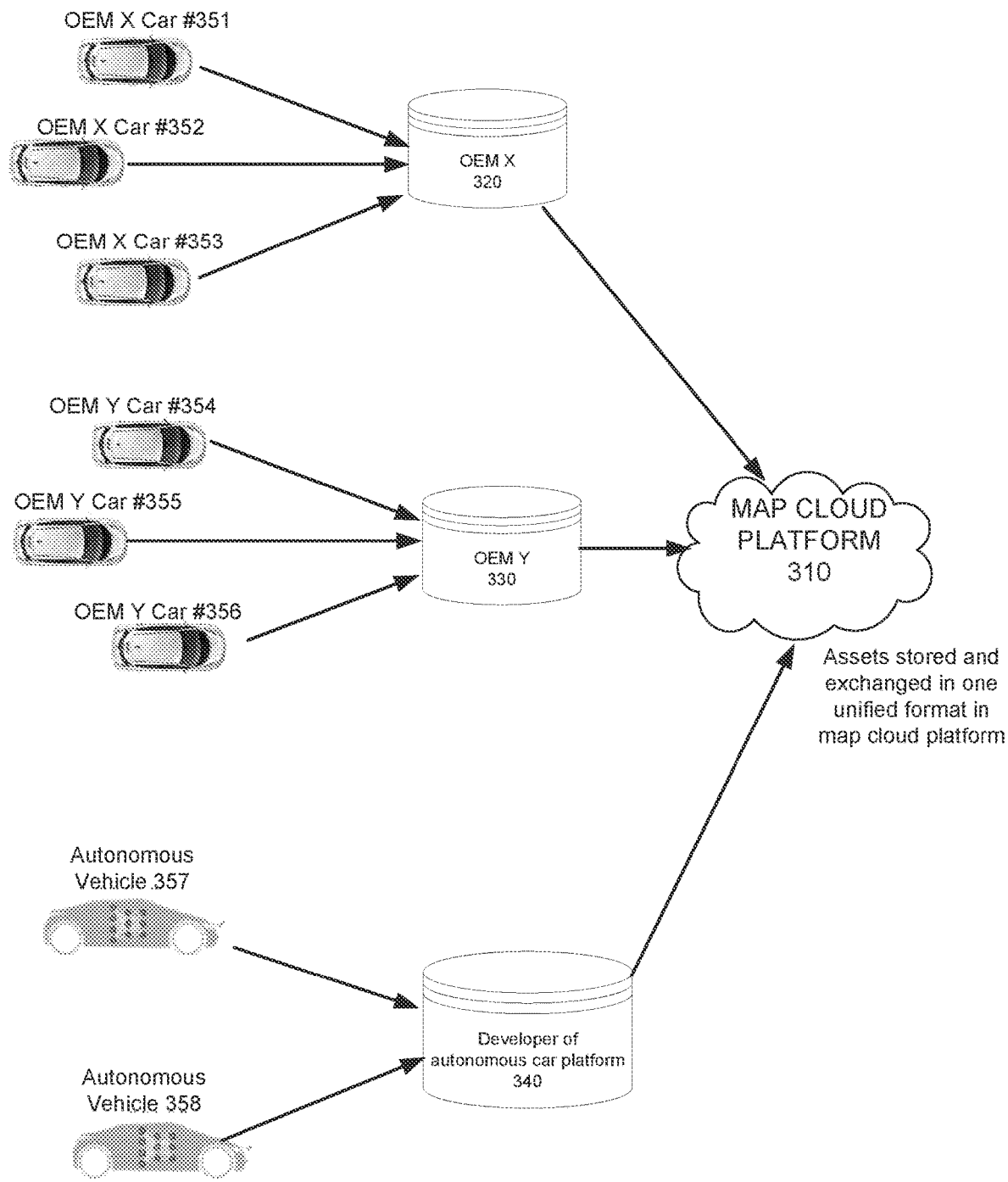
FIG. 3 illustrates the manner in which vehicles may connect to the map cloud platform on which the blockchain is implemented to provide map updates in accordance with an embodiment of the present invention.

FIG. 3 illustrates the manner in which vehicles may remotely connect to the map cloud platform on which the blockchain is implemented to provide map updates in accordance with an embodiment of the present invention. Both autonomous and non-autonomous vehicles may be allowed to consume or provide updates to the blockchain implemented on map cloud platform 310. As noted above, the non-autonomous vehicles will typically be equipped with a set of sensors or cameras that are able to capture route-based information.

As shown in FIG. 3, OEM X server 320 connects with non-autonomous vehicles 351, 352 and 353 and OEM Y server 330 connects with non-autonomous vehicles 354, 355 and 356—the vehicles transmit their updates to respective databases on OEM X server 320 and OEM Y server 330. The updates are, thereafter communicated to nodes on the blockchain implemented on map cloud platform 310 for verification. As mentioned previously, the map updates from servers 320 and 330 may already be in the unified format of the blockchain or, alternatively, may need to be converted prior to adding the updates to a block on the blockchain. Note, as mentioned previously, the vendor managing the blockchain on the map cloud platform 310 may provide each of the vendors in charge of servers 320 and 330 with an API to communicate their map updates to the map cloud platform.

Similar to the non-autonomous vehicles, autonomous vehicles 357 and 358 shown in FIG. 3 communicate their updates to a server 340 maintained by, for example, a developer of an autonomous car platform (or any other vendor that is part of the ecosystem). Server 340 may, for example, already communicate in a format consistent with the blockchain maintained on platform 310. Accordingly, server 340 may transmit the map update transactions directly to nodes on the blockchain without any need of conversion. It should be noted that both autonomous and non-autonomous vehicles may also request and consume map updates from the platform 310. In one embodiment, servers 320, 330 and 340 may be part of the map cloud platform 310 and may also be configured as nodes on the blockchain.

In one embodiment, the crypto-engine executing on platform 310 may enable blockchain-based verification and validate map updates whenever a vehicle is connected to the blockchain platform. Accordingly, instead of having a mapping company, an OEM, or any other vendor in the mapping ecosystem rely exclusively on survey cars or autonomous vehicles, the blockchain platform can be scaled up easily to expedite the progress of map updating in real-time with a proper validation mechanism and by every-day drivers, e.g., drivers of vehicles 351 to 356. Further, using the blockchain platform allows the expense and benefit of updating maps to be shared between multiple stakeholders, e.g., end consumers, OEMs, Tier 1 to Tier 3 suppliers etc.

Further, by using a blockchain-based mapping ecosystem, embodiments of the present invention advantageously provide a standardized mapping platform with a consistent format that solves the map update problem globally and democratizes the validation of map updates. Other challenges associated with conventional mapping solutions are also addressed by the mapping ecosystem of the present invention. For example, because blockchains are transparent and decentralized distributed databases, and each block is accompanied with a timestamp (and may be accompanied by a preceding block and a successor block), using a blockchain mechanism will allow traceability of any irregularities, e.g., any rogue updates to the map can be easily detected, their origin determined, and malicious updates scrapped. As a result, users of and contributors to the MUT-based system can be held accountable for the quality of the map updates provided and likewise rewarded or compensated for useful updates. Moreover, the transparency of the blockchain allows for transparent pricing for access to the ecosystem, accurate billing, and a mechanism for rewarding drivers and vendors for providing accurate map updates, e.g., by using MUTs.

Further, by implementing a semi-public blockchain for the mapping ecosystem, embodiments of the present invention advantageously allow access to the ecosystem to be controlled and the privacy of its members to be protected.

In a conventional blockchain platform, a network of communicating nodes performs blockchain maintenance. Each node validates transactions and adds them to its own local copy of the blockchain, and, subsequently, broadcasts block additions to other nodes. All these operations are performed in such a way that a distributed consensus emerges among network nodes about the information stored in the blockchain. If a block is forged and added to the chain, other nodes will find the data to be untrue. For example, in the Bitcoin crypto-currency system, the blockchain is used to store financial transaction records. Bitcoin attains consensus by using a Proof-of-Work algorithm, which is used to confirm transactions and produce new blocks to the chain. With Proof-of-Work, the responsibility for confirming transactions and arranging blocks (e.g. managing block additions) bears on special nodes called miners who compete against each other to complete transactions on the network and are rewarded.

By comparison, and importantly, embodiments of the present invention attain consensus for the map updates provided to the blockchain by using a tuple of multiple proofs, namely: a) Proof of Location (where the location of a map update is verified via other vehicles); b) Proof of Iterations (where a particular update is validated as true only after a number of similar updates are received); c) Proof of Safety (a combination of different risk avoidance, risk mitigation, prevention, validation, authorization techniques are used) that comprises at least one proof from the pool of safety proofs, such as, for example, Proof of Functional Safety; Proof of Safety of the Intended Function; Proof of System Safety, and alike; and d) Proof of Physical Delivery (the data authenticates its origin and accuracy).

It should be noted that not all proofs are required for consensus to be attained between the nodes. Consensus between the nodes may be attained with less than all four proofs discussed herein. For example, some embodiments of the present invention may only require a proof of location and a proof of iterations depending on the implementation choice and dependencies in such an implementation. By way of further example, some embodiments may only require one proof on any given occasion, but, at other times, a tuple of at least two proofs may be used. Embodiments of the present invention may be configured to dynamically and interchangeably select one or more proofs from the tuple of proofs based on several factors including, but not limited to, available sensor configurations, external conditions and the complexity of the environment.

Proof of Location

According to embodiments of the present invention, the blockchain 280 performs proof of location in order to verify the veracity of a location associated with a map update communication from a vendor or vehicle. To attain consensus on the location of a vehicle providing an update, a second map update communication that is within a threshold duration of time and corroborates the location of the vehicle providing the first map update communication is required from at least one other vehicle in proximity to the vehicle providing the update in order to validate the location of the reporting vehicle—this provides some validation of the truthfulness and accuracy of the reported update. In other words, at least two autonomous vehicles with an active connection to the blockchain platform would be required to provide a valid update that is based on the location of an autonomous vehicle. Or, alternatively, at least one other vehicle would need to report the location of the reporting vehicle so that the map update of the reporting vehicle can be verified at least to its reported location.

Figure 4:
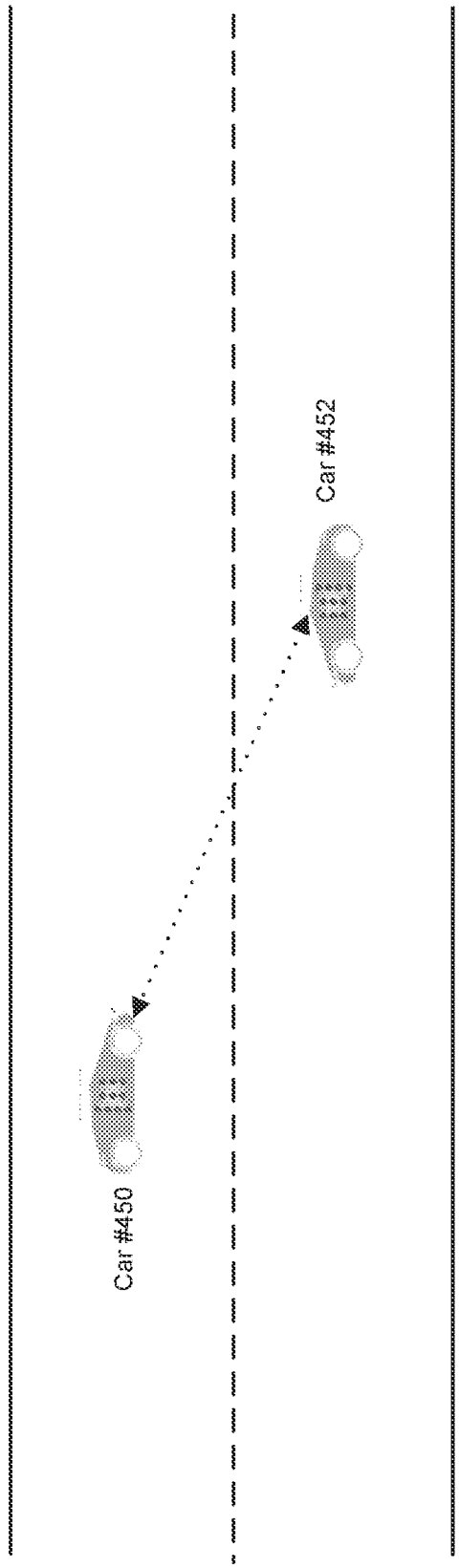
FIG. 4 is a diagram that illustrates the manner in which a proof of location can be established in accordance with an embodiment of the present invention.

FIG. 4 is a diagram that illustrates the manner in which a proof of location can be established in accordance with an embodiment of the present invention. As mentioned previously, an autonomous vehicle configured with the autonomous car development platform 230 is typically capable of precisely localizing itself to an HD map (also known as 'localization). If car 452 reports an update to its respective server with localization information, the update will typically need to be verified to ensure that car 452 is not reporting incorrect information (either due to malfunction or malicious actors). Similarly, car 450 will also transmit localization information to its respective server, which will need to be authenticated. Importantly, because cars 450 and 452 are in close proximity to one another, their respective cameras and sensors can detect and corroborate the locations of the other. For example, car 450 can confirm the localization information provided by car 452 and vice versa. Each car can independently transmit its confirmation of the other's location also to its respective server. In fact, this localization information may be reported to the respective server on a periodic basis.

In blockchain networks any transaction reported to a server or node on the blockchain will typically be communicated to one or more other nodes to attain consensus before the transaction can be recorded on the blockchain. When cars 450 and 452 report the localization information and a confirmation of each other's locations to their respective servers, the information is distributed to other nodes in the blockchain. Thereafter, the nodes can reach a consensus that the localization information provided by each of the cars is indeed accurate. With the received information, the server can match the location of the update from car 452 with the reported location of car 450 that also reports the presence of car 452 in close proximity. Proof of location is satisfied if the locations match. The map update information may then be added to a block and recorded in the blockchain (assuming the other proofs comprising the tuple of proofs are valid as well).

If, for example, car 452 reports confirmation information pertaining to the location of car 450 to its server, however, the information reported by car 452 does not corroborate with the localization information provided by car 450 to its own respective server, then both sets of information may be tagged as malicious or incorrect and be dismissed—unless other confirmations are received that validate either the information reported by car 450 or car 452 as being more accurate.

It should be noted that autonomous vehicles are not the only ones limited to providing localization information. Non-autonomous vehicles may also be configured with the intelligence in their GPS systems to provide localization information and may, further, be equipped with sensors and cameras to provide location confirmations for other vehicles on the road.

Proof of Iterations

In accordance with an embodiment of the present invention, the blockchain uses proof of iterations to verify the veracity of a map update which can help to weed out incorrect map updates which can be caused either by malfunctioning equipment, faulty and/or erroneous software algorithms, faulty and/or erroneous Al-based perception algorithms, and/or malicious actors. Multiple iterations (e.g., multiple reporting) on a single route will be needed to validate a map update to a particular route. For example, if two cars use the same route, and are providing a similar update report with respect to the route, then their updates and their routes can be compared and, in response to a determination that both cars used the same route and provided the same update, the route may be flagged as a candidate for a map update. The route itself may be a new route or there may be some update to a pre-existing route that is new.

Subsequently, a predetermined number of consistent, corroborating iterations are required for that route in order to update the blockchain. For example, when the platform is considering whether to add a newly discovered route, if the number of iterations required was 10, then either one car would need to use the same route 10 times or 10 different vehicles would each use the route once (or any other combination of cars and times driven totaling at least 10 instances of the driven route). Once the required number of iterations has been attained, the data collected from the various vehicles is unified and added to the blockchain in order to recognize and add the new route to the map. Similarly, if the platform needs to add a new update to a pre-existing route, e.g., as a result of an accident or construction work, a predetermined number of iterations need to be performed for that update to be integrated into the blockchain as a valid update. These updates may be performed by the same car traveling the same route multiple times or by multiple cars also traveling the same route. In one embodiment, the blockchain may require at least two different cars to perform the iterations in case one of the cars was a malicious actor or was providing compromised data as a result of malfunctioning cameras, sensors, and/or software.

Figure 5:
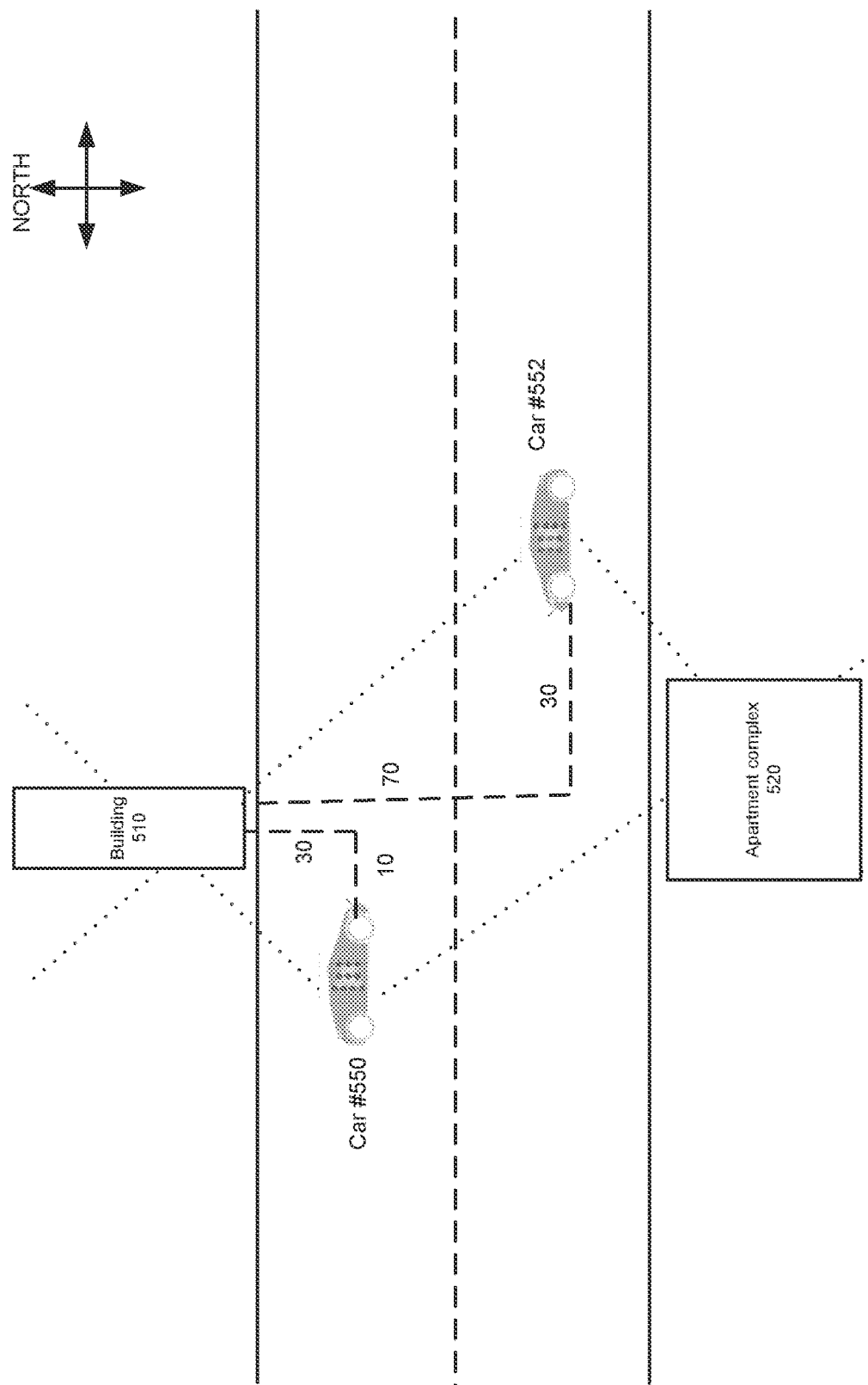
FIG. 5 illustrates the manner in which a proof of iterations can be established in accordance with an embodiment of the present invention.

FIG. 5 illustrates the manner in which a proof of iterations can be established in accordance with an embodiment of the present invention. Car 550 and Car 552 both travel a new route for the first time, where car 550 is traveling from west to east, while car 552 is traveling from east to west. Both cars can ascertain that they are traveling the same route by comparing the routes. For example, car 550 determines that it located building 510 ten yards to the east and 30 yards to the north, while car 552 determines that it located building 510 30 yards to the west and 70 yards to the north. Similarly, other infrastructural points of interest in the periphery including apartment complex 520 may be used to generate several other data points in order to triangulate the positions of the cars. After data regarding all the points of interest is transmitted to the nodes and normalized, the nodes use the normalized data to attempt to reach a consensus that both cars are traveling the same route. In other words, the nodes cross-reference the data from both cars and compare to see if the two data sets reinforce and support each other.

It should be noted that cars need not necessarily travel toward each other or in opposing directions in order to generate a candidate for a map update. In some embodiments, two cars traveling in the same direction (e.g., a multi-level road network such as a flyover or overpass) may also be able to generate a candidate for a map update if the nodes are able to cross-reference the two sets of data and attain consensus.

In response to a determination that both cars traveled the same route and provided a consistent update, the route may be flagged as a candidate for a map update. Subsequently, multiple iterations—either by cars 550 or 552 or other cars—may need to be performed on the same route during a predetermined timeframe in order to create a new block on the blockchain comprising the new route. If the two sets of data do not corroborate each other, they are either discarded or temporarily saved to see if further updates may confirm one of the data sets over the other.

The procedure for determining map updates, in one embodiment, needs to take into account the timing of the various updates provided. Because the blockchain keeps track of the timestamps of the various transactions, the timing for each attempted update can easily be extracted from the blockchain. For instance, for a given map segment, the requisite number of iterations needs to take place within a predetermined timeframe in order to be considered for a valid map update. If one or more of the iterations do not corroborate the same information as the majority of the other iterations by other vehicles, they can be discarded as having been reported by vehicles with malfunctioning equipment or malicious actors. For example, if forty iterations are performed on a particular route and all but two are reported to confirm the same data, the two aberrant iterations can be discarded. Requiring several iterations during a predetermined time period also helps eliminate short-term problems on a particular route from being updated on the blockchain. For example, if a temporary obstruction is caused by a delivery truck, there may not be enough iterations performed for the temporary obstruction to be approved as a valid map update on the blockchain before the obstruction is removed.

Further, vehicles passing through the same route at later times will, in one embodiment, confirm the map update. The map update remains valid while other vehicles passing through the same route keep confirming the update. If changes to the route occur and the map update is not valid anymore, a new set of updates would be culled from vehicles using the same route. For example, a route may be updated in the morning by vehicles traveling the route and there may not be any significant changes to the route during the day. Thereafter, all the cars traveling the same route during the day confirm the updates that were provided in the morning and, accordingly, the same map update remains valid through the day. In the evening, however, if construction blocks off part of the route, then new updates may need to be culled from the vehicles. These new updates will need to go through the same validation procedure, e.g., requiring a pre-requisite number of iterations during a predetermined time window.

In some embodiments, certain types of updates may be flagged with a higher priority and fewer numbers of iterations may be required in order to push the high priority updates to the blockchain. For example, if any car provides an update regarding an ambulance or fire engine, instead of the requisite 10, only 2 iterations may be required to flag it as a valid map update.

Proof of Physical Delivery

The proof of physical delivery is a consensus based on the physical delivery value chain. Physical consensus is achieved by automating the data shipment from a vehicle to a digital database at a data center for further AI processing. For example, a solid-state drive may be shipped by the owner of an autonomous vehicle containing map related data. In this case, a tracking number may be used as a proof of physical delivery. This verifies both the data authenticity and also its accuracy. By way of another example, a survey car operated by a vendor may need to regularly ship map related data to the digital database maintained by a vendor. In this instance, a proof of physical delivery that can be added to the blockchain in the form of a tracking number helps make the data traceable.

Embodiments of the present invention, however, also cover the uploading of all the mapping related information from the car directly to the vendor data center using high speed cellular or Wi-Fi connections if bandwidth is available.

Figure 6:
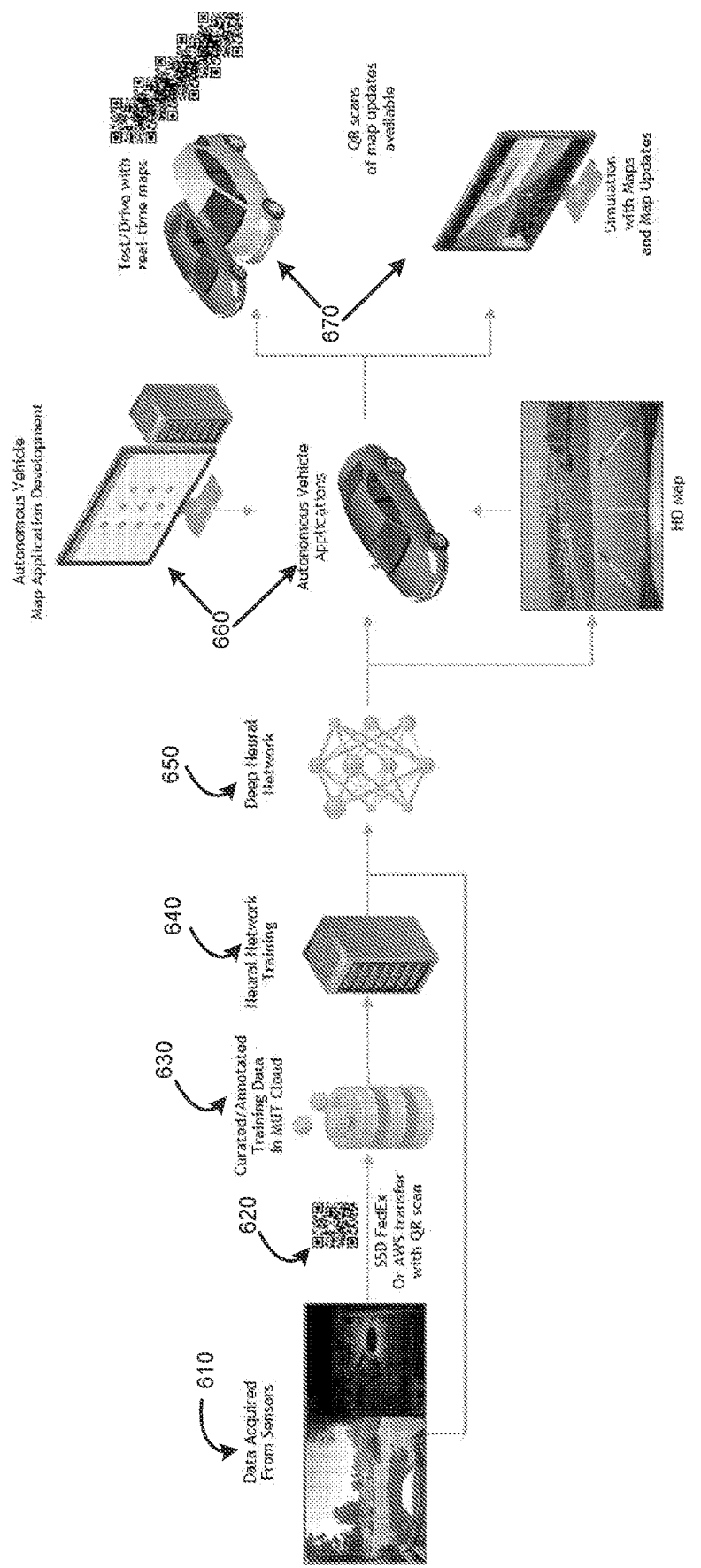
FIG. 6 is a flow diagram that illustrates an exemplary computer implemented method in which a proof of physical delivery can be established in accordance with an embodiment of the present invention.

FIG. 6 is a data flow diagram that illustrates an exemplary computer implemented method in which a proof of physical delivery can be established in accordance with an embodiment of the present invention. At step 610, data is acquired from the sensors placed on a vehicle. This data may be stored on a solid-state drive within the vehicle and may be shipped at step 620 to a data center—a tracking number is obtained as proof of physical delivery. At step 630, the data is curated and annotated in the map cloud platform 310. Subsequently, neural network training is performed using the data at step 640. In other words, the data gathered from the vehicles is used to train deep learning processes. After the neural network is trained at step 650, it is used in autonomous vehicle applications and for autonomous vehicle map application development at step 660. Thereafter, at step 670, the autonomous vehicles may be test-driven with real-time maps or simulations may be conducted with maps and map updates.

Proof of Safety

The map maintenance server may perform proof of safety in order to provide reliability with accurate map updates. For example, in one embodiment, proof of safety requires: a) redundancy of implementation and b) diversity of implementation. Requiring multiple different proofs (a diversity of proofs) attains diversity of implementation. Proof of location, proof of iterations and proof of physical delivery, as required by embodiments of the present invention, provide three different or diverse mechanisms of validating the data.

Redundancy of implementation is attained by requiring multiple sources for the same updates or multiple iterations of the same update. For example, multiple proofs of location may be required within a particular time range. If two autonomous vehicles are in close proximity, multiple proofs of location may be determined over a period of time with each proof of location tagged with a unique time-stamp. If the multiple proofs of location within a time range all agree with each other, then a proof of safety has also been attained.

As noted above, embodiments of the present invention may be configured to dynamically and interchangeably select one or more proofs from the tuple of proofs based on several factors including, but not limited to, available sensor configurations, external conditions and the complexity of the environment. Each node in the blockchain network may be configured with the intelligence to determine the number of proofs that will be required to validate the transaction. For example, if the environment to which the map update applies is complex or the external weather conditions make localizing vehicles challenging, a node may require both proofs of location and iterations to validate a map update transaction.

In another scenario, for example, where consistent information is received from multiple platforms regarding iterations made over a given route, a proof of location may not be necessary for a node to validate a map update transaction pertaining to the route. In such an instance, a node may dynamically elect to perform only the proof of iterations to validate the map update. In a different scenario, if an update is received from a highly sensitive, military grade LiDAR in an environment with no other prevailing complexities, a proof of location may be sufficient to validate the transaction. In other words, the proof of iterations may be dropped for a map update transaction that is received from reliable sensor configurations.

In one or more embodiments, the information pertaining to the tuple of proofs is maintained in a data structure within the data record associated with a map update. The data structure is dynamic and can comprise information regarding one or multiple proofs, depending on the number of proofs that were required to validate the transaction.

In some embodiments of the present invention, a map update is not added to a block in the blockchain with a valid timestamp until proof of safety has been attained.

Figure 7:
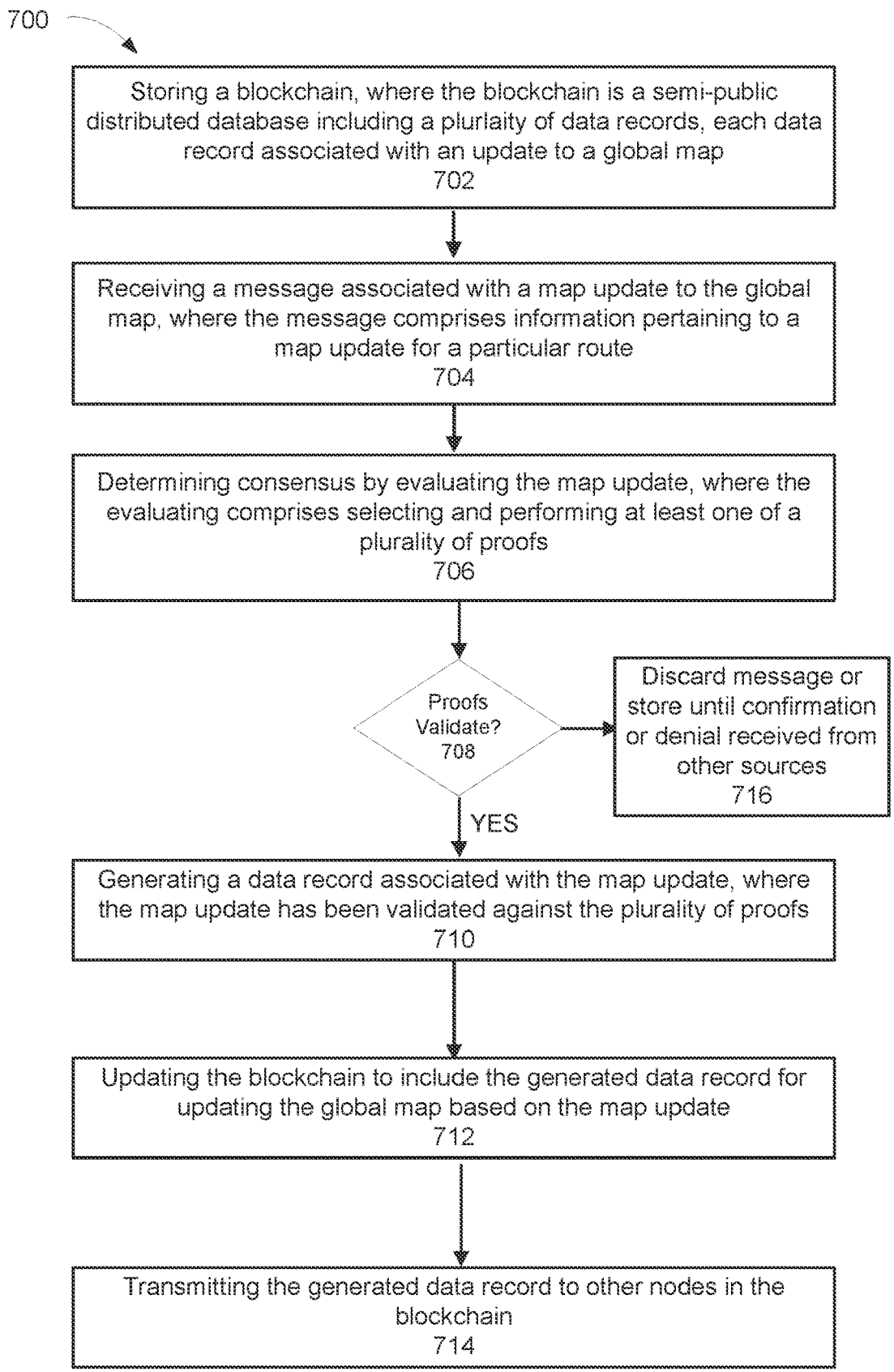
FIG. 7 depicts a flowchart of an exemplary computer implemented process for validating map updates using a blockchain in accordance with an embodiment of the present invention.

FIG. 7 depicts a flowchart of an exemplary computer implemented process for validating map updates using a blockchain in accordance with an embodiment of the present invention.

At step 702, a blockchain is distributed across servers that are part of the map cloud platform 250 and comprises data for maintaining a global map of a predetermined geographic area. The blockchain can either be maintained on dedicated nodes within the map cloud platform (e.g., blockchain 260) or could also include servers maintained by the various vendors (e.g., blockchain 280). The vendors may include mapping companies, OEMs, software provider companies, map update companies, semiconductor companies, companies delivering ground truth data, Tier 1 suppliers, etc. The blocks of the blockchain comprises data records, where the data records pertain to updates to the global map.

At step 704, a message associated with a map update to the global map is received. The message may be transmitted either by a vehicle or one of the vendors in the mapping ecosystem. The message may pertain to a map update for a particular route and may be timestamped.

At step 706, the received map update is evaluated by one or more nodes on the blockchain to determine consensus on whether the update is an accurate one. In order to reach consensus, the evaluating comprises selecting and performing at least one of a plurality of proofs including a proof of location, a proof of iterations, a proof of physical delivery and a proof of safety. In one embodiment, the selecting of one or more proofs can be based, in part, on a number of factors, for example, available sensor configurations, external conditions and the complexity of the environment.

At step 708, a determination is made as to whether consensus was attained and if the proofs validated the map update. If the map update is not validated, then at step 716, the message is discarded or stored temporarily until further evaluation can take place. For example, the message may be stored to wait for future updates that may confirm or deny the map update associated with the message.

If the map update is validated, then at step 710, a data record is generated, where the data record is associated with the map update received. The data record may be part of other data records that are added to a new block on the blockchain.

At step 712, the blockchain is updated with the new data record and the global map is updated based on the map update in the new data record.

At step 714, the updated blockchain may be transmitted to other nodes in the blockchain. The other nodes may, for example, update their local copies of the blockchain and perform further validation.

Figure 8:
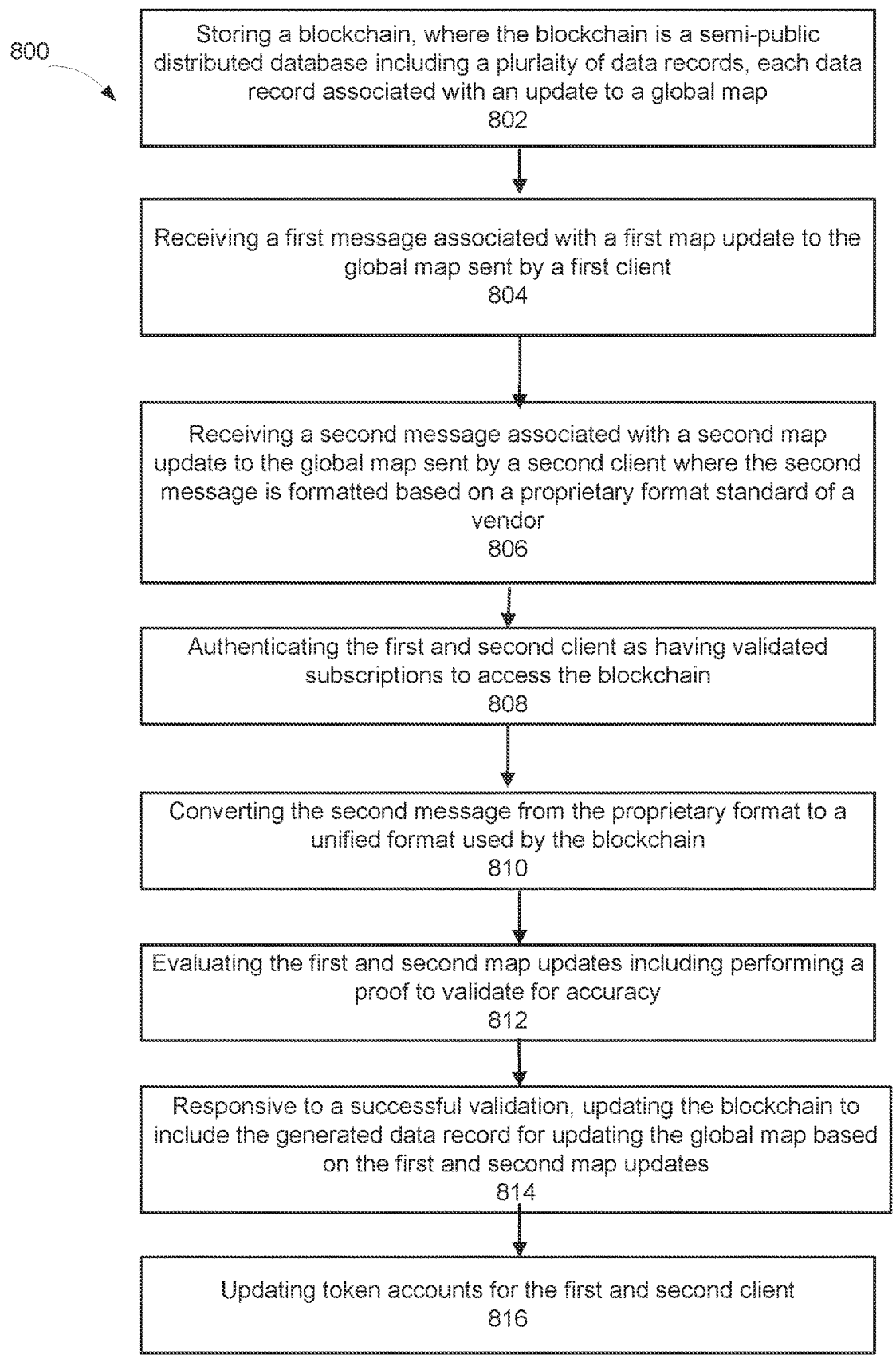
FIG. 8 depicts a flowchart of an exemplary computer implemented process for maintaining map data using a blockchain in accordance with an embodiment of the present invention.

FIG. 8 depicts a flowchart of an exemplary computer implemented process for maintaining map data using a blockchain in accordance with an embodiment of the present invention.

At step 802, a blockchain is stored at a server (or node) that is part of a blockchain. The blockchain is distributed across servers that are part of the map cloud platform 250 and comprises data for maintaining a global map of a predetermined geographic area. The blockchain can either be maintained on dedicated nodes within the map cloud platform (e.g., blockchain 260) or could also include servers maintained by the various vendors (e.g., blockchain 280). The blocks of the blockchain comprises data records, where the data records pertain to updates to the global map.

At step 804, a first message is received at the server from a first client, where the first message is associated with a first map update to the global map. The message may pertain to a map update for a particular route. The map update may already be in the unified format of the blockchain and may not need to be further formatted.

At step 806, a second message is received at the server from a second client, where the second message is associated with a second map update to the global map. The message may pertain to a map update for a particular route, however, unlike the first message, the second message may be in a vendor-specific format and may need to be formatted to make it compatible with the blockchain format.

At step 808, the first and second clients are authenticated by the server as having valid subscriptions or access privileges for accessing the blockchain.

At step 810, the second message is converted from the vendor-specific format into a unified format supported by the blockchain.

At step 812, the first and second map updates are evaluated. The evaluation comprises performing a proof to validate the updates as being accurate.

At step 814, the blockchain is updated with a new data record based on the first and second map updates and the global map is updated based on the map updates in the new data record.

At step 816, token accounts for the first and second client are updated, where the token accounts define access privileges to the blockchain. As mentioned previously, the MUTs can, in one or more embodiments, be used to control access to the mapping data on the blockchain. For example, using encrypted keys and/or smart contracts, the map cloud platform 250 may make map updates available only to members of the ecosystem that have a requisite number of MUTs to acquire the updates. The MUTs, in other words, can be used as currency to purchase or sell map updates. As mentioned previously, according to one or more embodiments, the MUTs may be tied to a monetary incentive that a driver or vendor receives for providing a certain number of accurate map updates. Alternatively, the MUTs may be exchanged for credits that entitle a driver or vendor to consume a certain number of map updates from the mapping system free of charge.

Figure 9:
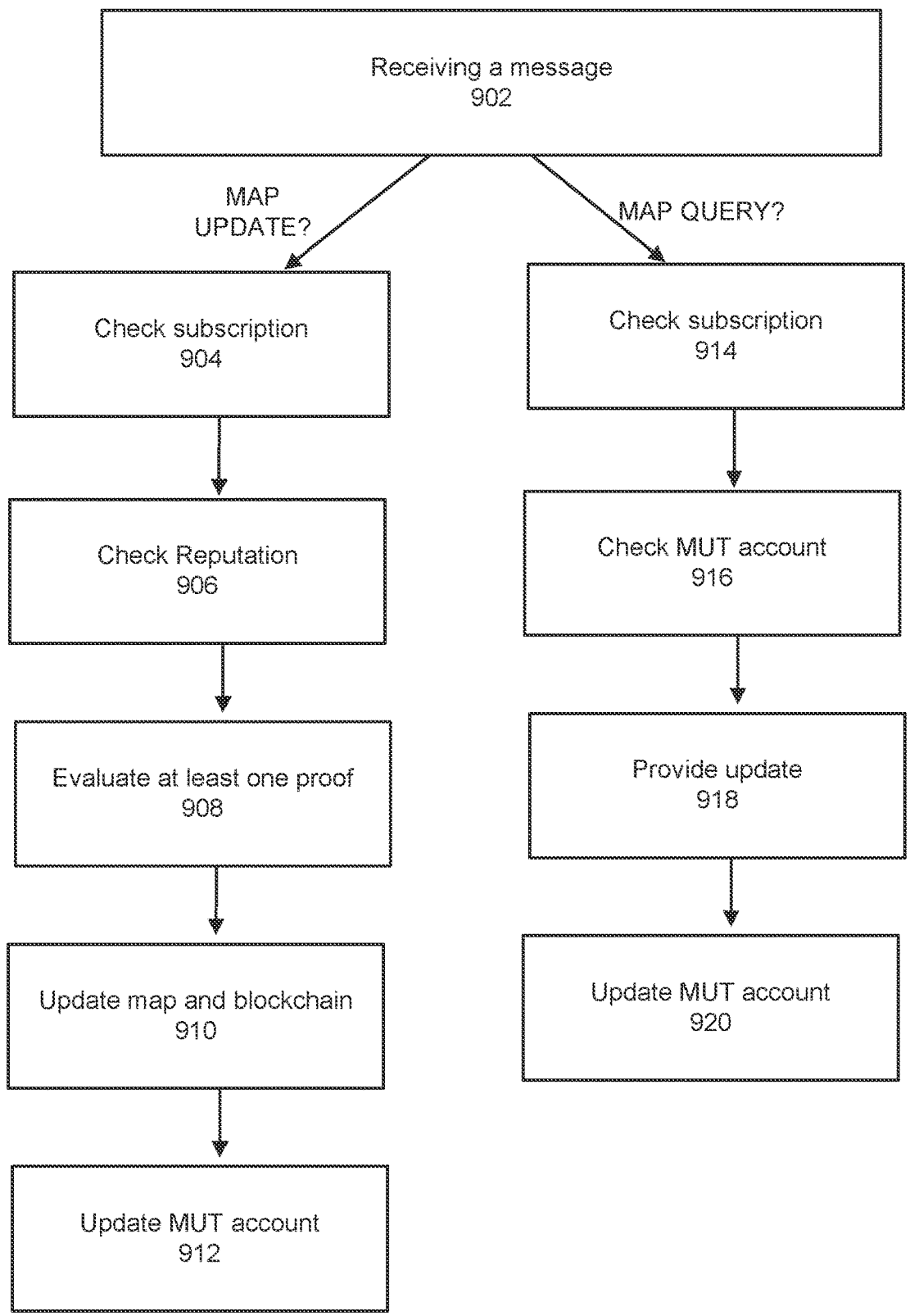
FIG. 9 is a data flow diagram that illustrates an exemplary computer implemented method for updating a token account associated with a client in accordance with an embodiment of the present invention.

FIG. 9 is a data flow diagram that illustrates an exemplary computer implemented method for updating a token account associated with a client in accordance with an embodiment of the present invention.

At step 902, a message is received from a client, e.g., an autonomous vehicle, a survey car, etc. Note that messages may also be received from vendors, e.g., mapping companies, OEMs, software provider companies, semiconductor companies, companies delivering ground truth data, Tier 1 suppliers, etc. The message may either comprise a request to provide an update a global map or to download a map update from the blockchain maintained on the cloud platform.

If the message comprises a request to provide a map update, then at step 904, a subscription account associated with the client is checked to determine if the client has a valid and active subscription to the mapping platform.

Subsequently, at step 906, a reputation associated with a client may be checked to determine if the reputation is above a threshold level. If the reputation is above the requisite threshold level, the client may be allowed to make updates to the blockchain. In one embodiment, MUTs can also be used to track the reputation and credibility of a particular driver or vendor. A driver may build a reputation score by contributing updates that do not get corrected or replaced with more accurate data from other sources. Drivers with high reputation scores may be rewarded with MUTs and assigned a private key for contributing their updates to the cloud platform.

At step 908, the received map update is evaluated by one or more nodes on the blockchain to determine consensus on whether the update is an accurate one. As mentioned previously, in order to reach consensus, the evaluating comprises selecting and performing at least one of a plurality of proofs including a proof of location, a proof of iterations, a proof of physical delivery and a proof of safety. In one embodiment, the selecting of one or more proofs can be based, in part, on a number of factors, for example, available sensor configurations, external conditions and the complexity of the environment.

At step 910, if the map update is validated, a data record is generated, where the data record is associated with the map update received. The data record may be part of other data records that are added to a new block on the blockchain.

At step 912, the MUT account associated with the client is adjusted. For example, if the update is validated and recognized to be accurate, the client may be rewarded more tokens and the balance of the MUT account may be increased accordingly.

If the received message at step 902 is associated with a request to consume a map update, then at step 914, a subscription account associated with the client is checked to determine if the client has a valid and active subscription to the mapping platform. Further, at step 916, an MUT account associated with the client is also checked to determine if the client has enough tokens for consuming map updates.

At step 918, if the client has access privileges and enough MUTs in the MUT account, a map update is provided to the client in accordance with the request.

Finally, at step 920, MUT account associated with the client is adjusted. For example, the balance on the MUT account may be deducted to reflect the consumption of new map updates by the client.

Exemplary Computing System

Figure 10:
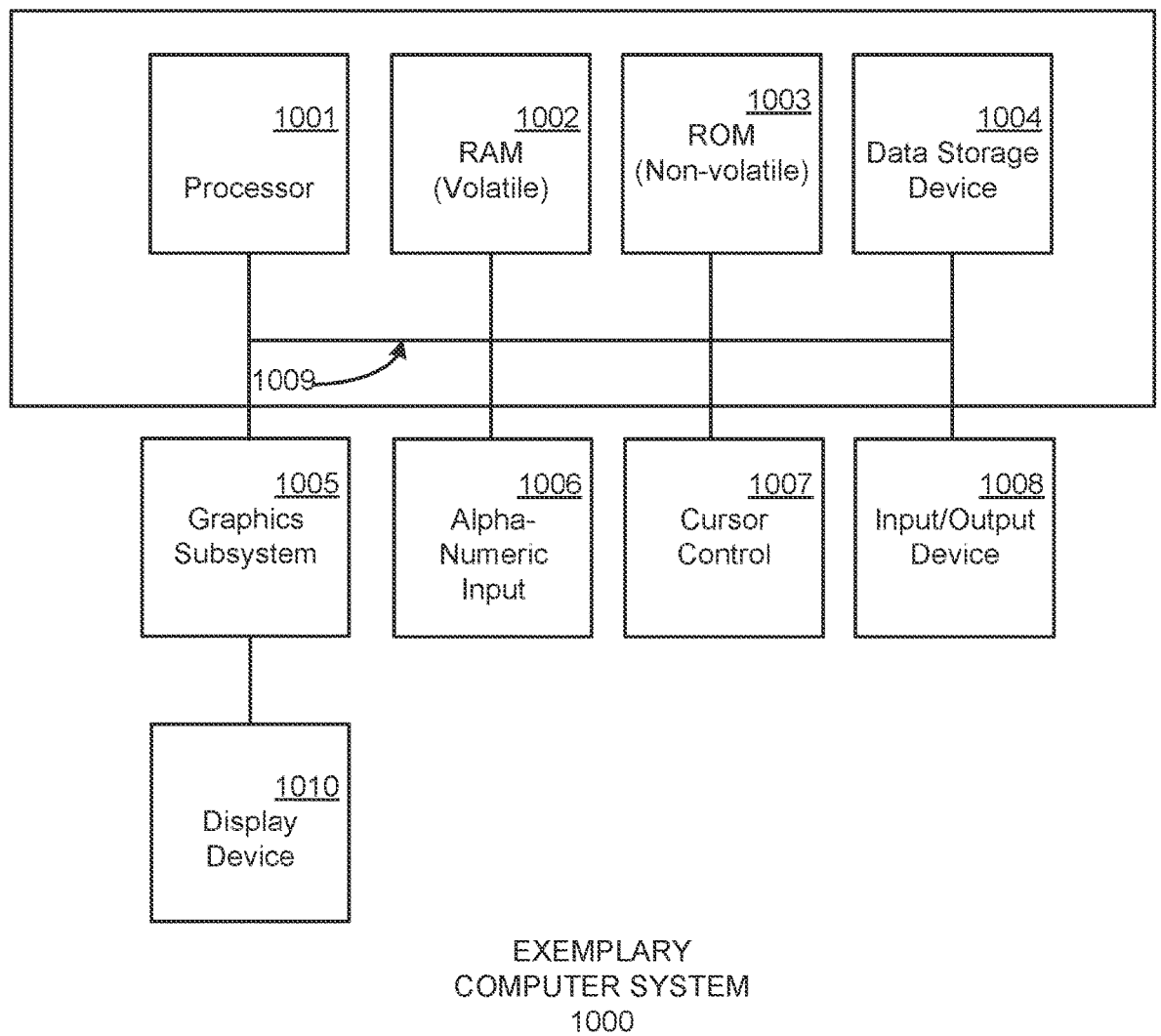
FIG. 10 illustrates an exemplary computer system for implementing embodiments of the present invention.

As presented in FIG. 10, an exemplary system for implementing embodiments includes a general purpose computing system environment, such as computing system 1000. For example, computing system 1000 may be used to implement one of the servers (or nodes) on the blockchain within the map cloud platform at which the updates are received. In its most basic configuration, computing system 1000 typically includes at least one processing unit 1001 and memory, and an address/data bus 1009 (or other interface) for communicating information. Depending on the exact configuration and type of computing system environment, memory may be volatile (such as RAM 1002), non-volatile (such as ROM 1003, flash memory, etc.) or some combination of the two. Computer system 1000 may also comprise one or more graphics subsystems 1005 for presenting information to the computer user, e.g., by displaying information on attached display device 1010.

Additionally, computing system 1000 may also have additional features/functionality. For example, computing system 1000 may also include additional storage (removable and/or non-removable) including, but not limited to, magnetic or optical disks or tape. Such additional storage is illustrated in FIG. 10 by data storage device 1004. Because the blockchain of the present invention is a distributed database, parts of the blockchain ledger may be implemented on data storage device 1004. Computer storage media includes volatile and nonvolatile, removable and non-removable media implemented in any method or technology for storage of information such as computer readable instructions, data structures, program modules or other data. RAM 1002, ROM 1003, and data storage device 1004 are all examples of computer storage media.

Computer system 1000 also comprises an optional alphanumeric input device 1006, an optional cursor control or directing device 1007, and one or more signal communication interfaces (input/output devices, e.g., a network interface card) 1008. Optional alphanumeric input device 1006 can communicate information and command selections to central processor 1001. Optional cursor control or directing device 1007 is coupled to bus 1009 for communicating user input information and command selections to central processor 1001. Signal communication interface (input/output device) 1008, which is also coupled to bus 1009, can be a serial port. Communication interface 1009 may also include wireless communication mechanisms. Using communication interface 1009, computer system 1000 can be communicatively coupled to other computer systems over a communication network such as the Internet or an intranet (e.g., a local area network), or can receive data (e.g., a digital television signal).

In the foregoing specification, embodiments have been described with reference to numerous specific details that may vary from implementation to implementation. Thus, the sole and exclusive indicator of what is the invention and what is intended by the applicant to be the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. At least one processor comprising:
one or more circuits to:
receive first location information of a first mobile unit based at least on the first mobile unit reporting the first location information in association with one or more map updates, from the first mobile unit, to one or more maps;
determine, using sensor data obtained using one or more sensors of a second mobile unit, second location information of the second mobile unit;
evaluate a validity of the one or more map updates from the first mobile unit based at least on a proximity between the first location information and the second location information; and
cause, based at least on evaluating indicating the validity, an update to one or more distributed databases to include one or more data records that update the one or more maps based at least on the one or more map updates.

2. The at least one processor of claim 1, wherein the first location information comprises first localization data obtained by the first mobile unit and the second location information comprises second localization data obtained by the second mobile unit.

3. The processor of claim 1, wherein the evaluating is based at least on the second mobile unit detecting the first mobile unit in one or more fields of view of one or more sensors of the second mobile unit.

4. The at least one processor of claim 1, wherein the evaluating is based at least on:
comparing, using the first location information and the second location information, a first route of the first mobile unit to a second route of the second mobile unit; and
determining, based at least on the comparing, the first route and the second route correspond to a same route.

5. The at least one processor of claim 1, wherein the evaluating is based at least on comparing, using the first location information and the second location information, a first route of the first mobile unit to a second route of the second mobile unit.

6. The processor at least one of claim 1, wherein the one or more distributed databases comprise one or more distributed ledgers and the first mobile unit and the second mobile unit comprise nodes of the one or more distributed ledgers.

7. The at least one processor of claim 1, wherein the evaluating is performed using a third mobile unit associated with the one or more distributed databases.

8. The at least one processor of claim 1, wherein the first mobile unit and the second mobile unit are vehicles, and the vehicles include one or more of an autonomous vehicle or a semi-autonomous vehicle.

9. The at least one processor of claim 1, wherein the evaluating is based at least on a plurality of verifications of a plurality of locations of the first mobile unit along a route, and the update is based at least on a quantity of the plurality of verifications.

10. The at least one processor of claim 1, wherein the at least one processor is comprised in at least one of:
a control system for an autonomous or semi-autonomous machine;
a perception system for an autonomous or semi-autonomous machine;
a system for performing simulation operations;
a system for performing deep learning operations;
a system implemented at least partially in a data center; or
a system implemented at least partially using cloud computing resources.

11. A system comprising:
one or more processing units to cause an update to one or more distributed databases to include one or more data records that update one or more maps using one or more map updates from a first mobile unit based at least on an evaluation of the one or more map updates indicating a validity of the one or more map updates, the evaluation being based at least on a proximity between first location information of the first mobile unit and second location information of a second mobile unit, the first location information reported using the first mobile unit in association with the one or more map updates.

12. The system of claim 11, wherein the first location information comprises first localization data obtained using the first mobile unit and the second location information comprises second localization data obtained using the second mobile unit.

13. The system of claim 11, wherein the update is based at least on a plurality of confirmations for the one or more map updates computed by a plurality of mobile units associated with the one or more distributed databases.

14. The system of claim 11, wherein the evaluation indicates a first route of the first mobile unit and a second route of the second mobile unit correspond to a same route.

15. The system of claim 11, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented at least partially in a data center; or
a system implemented at least partially using cloud computing resources.

16. A computer-implemented method comprising:
receiving first location information corresponding to a first mobile unit based at least on the first mobile unit reporting the first location information in association with one or more map updates, from the first mobile unit, to one or more maps;

comparing the first location information to second location information of a second mobile unit;

determining a validity of the one or more map updates from the first mobile unit based at least on the comparing indicating a proximity between the first location information and the second location information; and causing, based at least on determining of the validity, an update to one or more distributed databases to include one or more data records that update the one or more maps based at least on the one or more map updates.

17. The method of claim 16, wherein the first location information comprises first localization data obtained using the first mobile unit and the second location information comprises second localization data obtained using the second mobile unit.

18. The method of claim 16, wherein the determining the validity is based at least on the second mobile unit detecting the first mobile unit in one or more fields of view of one or more sensors of the second mobile unit.

19. The method of claim 16, wherein the determining the validity is based at least on comparing, using the first location information and the second location information, a first route of the first mobile unit to a second route of the second mobile unit.

20. The method of claim 16, wherein the one or more distributed databases comprise one or more distributed ledgers and the first mobile unit and the second mobile unit comprise nodes of the one or more distributed ledgers.

* * * * *